(12) United States Patent
Chen et al.

(10) Patent No.: US 11,822,030 B2
(45) Date of Patent: Nov. 21, 2023

(54) SYSTEM AND METHOD FOR SEISMIC DEPTH UNCERTAINTY ANALYSIS

(71) Applicant: Chevron U.S.A. Inc., San Ramon, CA (US)

(72) Inventors: Jinsong Chen, Fulshear, TX (US); Huafeng Liu, Bellaire, TX (US); Andrey Hanan Shabelansky, Bellaire, TX (US); Cory James Hoelting, West University Place, TX (US); Min Yang, Houston, TX (US); Ying Tan, Sugar Land, TX (US); Maisha Lara Amaru, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 17/654,630

(22) Filed: Mar. 14, 2022

(65) Prior Publication Data
US 2023/0288593 A1 Sep. 14, 2023

(51) Int. Cl.
*G01V 1/34* (2006.01)
*G01V 1/28* (2006.01)
*G06N 7/01* (2023.01)

(52) U.S. Cl.
CPC ............ *G01V 1/345* (2013.01); *G01V 1/282* (2013.01); *G06N 7/01* (2023.01); *G01V 2210/60* (2013.01); *G01V 2210/74* (2013.01)

(58) Field of Classification Search
CPC ........... G01V 1/345; G01V 1/282; G01N 7/01
See application file for complete search history.

(56) References Cited

U.S. PATENT DOCUMENTS

| 8,180,602 B2 * | 5/2012 | Barboza | E21B 49/00 703/2 |
| 8,442,770 B2 * | 5/2013 | Bruun | G01V 1/305 702/18 |
| 8,694,262 B2 | 4/2014 | Schultz | |

OTHER PUBLICATIONS

Hejun Zhu et al., "A Bayesian approach to estimate uncertainty for full-waveform Inversion using a priori information from depth migration," Geophysics, vol. 81, No. 5 (Sep.-Oct. 2016), p. R307-R323, Society of Exploration Geophysicists.

Oleg V. Poliannikov et al., "The effect of velocity uncertainty on migrated reflectors: improvements from relative-depth imaging," Geophysics, vol. 81, No. 1 (Jan.-Feb. 2016), p. S21-S29, Society of Exploration Geophysicists.

(Continued)

*Primary Examiner* — Kyle R Quigley
(74) *Attorney, Agent, or Firm* — Marie L. Clapp (57) ABSTRACT

A method is described for seismic depth uncertainty analysis including receiving wavelet basis functions and cutoff thresholds and randomly perturbing wavelet coefficients in reduced wavelet space based on the wavelet basis functions and the cutoff thresholds to generate a plurality of random wavelet fields; receiving a reference model in a depth domain; transforming the plurality of random wavelet fields to the depth domain and combining them with the reference model to form candidate models; performing a hierarchical Bayesian modeling with Markov Chain Monte Carlo (MCMC) sampling methods using the candidate models as input to generate a plurality of realizations; and computing statistics of the plurality of realizations to estimate depth uncertainty. The method may be executed by a computer system.

12 Claims, 6 Drawing Sheets

(56) References Cited

OTHER PUBLICATIONS

Alberto Malinverno et al., "Expanded uncertainty quantification in inverse problems: Hierarchical Bayes and empirical Bayes," Geophysics, vol. 69, No. 4 (Jul.-Aug. 2004), p. 1005-1016, Society of Exploration Geophysicists.
H. Grubb et al., "Estimating and interpreting velocity uncertainty in migrated images and AVO attributes," Geophysics, vol. 66, No. 4 (Jul.-Aug. 2001), p. 1208-1216, Society of Exploration Geophysicists.
Jinsong Chen et al., "Effects of uncertainty in rock-physics models on reservoir parameter estimation using seismic amplitude variation with angle and controlled-source electromagnetics data," Geophysical Prospecting, 2009, 57, pp. 61-74, European Association of Geoscientists & Engineers.
Wei Liu et al., "Mitigation of uncertainty in velocity and anisotropy estimation for pre-stack depth imaging," SEG Int'l Exposition and 74th Annual Meeting, Oct. 10-15, 2004.
Yingping Li et al., "Borehole seismic quantitative diagnosis of a seismic velocity model for 3D seismic imaging of subsurface structures," Geophysical Prospecting, 2014, 62, p. 719-739, Shell Global Solutions International B.V.

\* cited by examiner

SYSTEM AND METHOD FOR SEISMIC DEPTH UNCERTAINTY ANALYSIS

TECHNICAL FIELD

The disclosed embodiments relate generally to techniques for seismic imaging and, in particular, to analyzing depth uncertainty that is inherent in seismic imaging in order to improve production from hydrocarbon reservoirs.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. Seismic acquisition over subsurface structure generally produces time-domain data, which is then migrated to, for example, depth image data. The migration process necessarily involves certain assumptions regarding the propagation velocity of elastic waves through the subsurface materials and structures. Moreover, there is generally some degree of anisotropy in geological formations. That is, while it may be possible to determine vertical velocities using well data, the velocities estimated using multi-offset seismic techniques will necessarily be somewhat different from measured vertical velocities. Finally, because assumptions, based on measurement or estimation, regarding both velocities and degrees of anisotropy may be incorrect, there is some inherent uncertainty in the resulting depth image, both in the depth of imaged events and in the structural interpretation of the events.

Models of the subsurface obtained from geophysical measurements are inherently non-unique. Geophysical measurements are finite in resolution and relate to many orders of magnitude of scale. Uncertainty in the measurements results from a variety of sources, including signal-to-noise ratio, data acquisition parameter selection, processing algorithms, or the above-mentioned velocity and anisotropy parameter selection. It is therefore important to understand the degree of that uncertainty when evaluating model results. That is, it is important to quantitatively understand to what degree the models are sensitive to a given change or group of changes in the assumptions regarding velocities, anisotropy or the other factors impacting uncertainty. An understanding of the uncertainty and the range of possible characterizations allows interpreters of the data to make business decisions regarding reserve estimation, well placement and count, development scenarios, secondary recovery strategies and other factors that ultimately impact recovery and project economics.

SUMMARY

In accordance with some embodiments, a method of seismic depth uncertainty analysis including receiving wavelet basis functions and cutoff thresholds and randomly perturbing wavelet coefficients in reduced wavelet space based on the wavelet basis functions and the cutoff thresholds to generate a plurality of random wavelet fields; receiving a reference model in a depth domain; transforming the plurality of random wavelet fields to the depth domain and combining them with the reference model to form candidate models; performing a hierarchical Bayesian modeling with Markov Chain Monte Carlo (MCMC) sampling methods using the candidate models as input to generate a plurality of realizations; and computing statistics of the plurality of realizations to estimate depth uncertainty is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of depth uncertainty analysis. Among all information that seismic images can provide, the depth of subsurface structures is of particular interest when evaluating prospects. Despite of recent accuracy improvement from advanced acquisition and imaging technologies, a large degree of uncertainty in depth still remains. The uncertainty could come from a variety of sources, for example, rock property variations, the limited locations to acquire band-limited seismic data, and complex subsurface structures (faults and anisotropy).

Given those limitations, quantitative and accurate estimation of depth uncertainty is critical for the purposes of prospect evaluation.

There have been many attempts along various directions to estimate depth uncertainty in seismic imaging. One conceptually simple but practical method was disclosed by U.S. Pat. No. 8,694,262 which first derives lower and upper bounds of seismic velocity and anisotropic parameters from reference models based on detectability threshold and then draws multiple realizations within the ranges. Although the realizations (including velocity and anisotropy) could provide acceptable seismic images for estimating depth uncertainty, strong assumptions are often made to make the estimation feasible due to the extremely large model space and the computational cost of the most advanced seismic imaging techniques. One common practice is to assume locally 1-D models. However, when subsurface geology varies laterally, the accuracy of the depth uncertainty estimation may significantly be reduced; therefore, 3D-varying models are needed. Since the physical extension of typical seismic imaging 3D volume is often of tens of kilometers in lateral directions and around ten kilometers in the vertical direction, traditional methods for drawing samples are prohibitive.

Bayesian approaches with Markov chain Monte Carlo (MCMC) sampling have been successfully applied to many situations for uncertainty analysis. This is because the Bayesian framework provides a rigorous and systematical approach for integrating multi-source of information, and MCMC techniques provide effective ways to sample high-dimensional posterior distribution.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Figure 1:
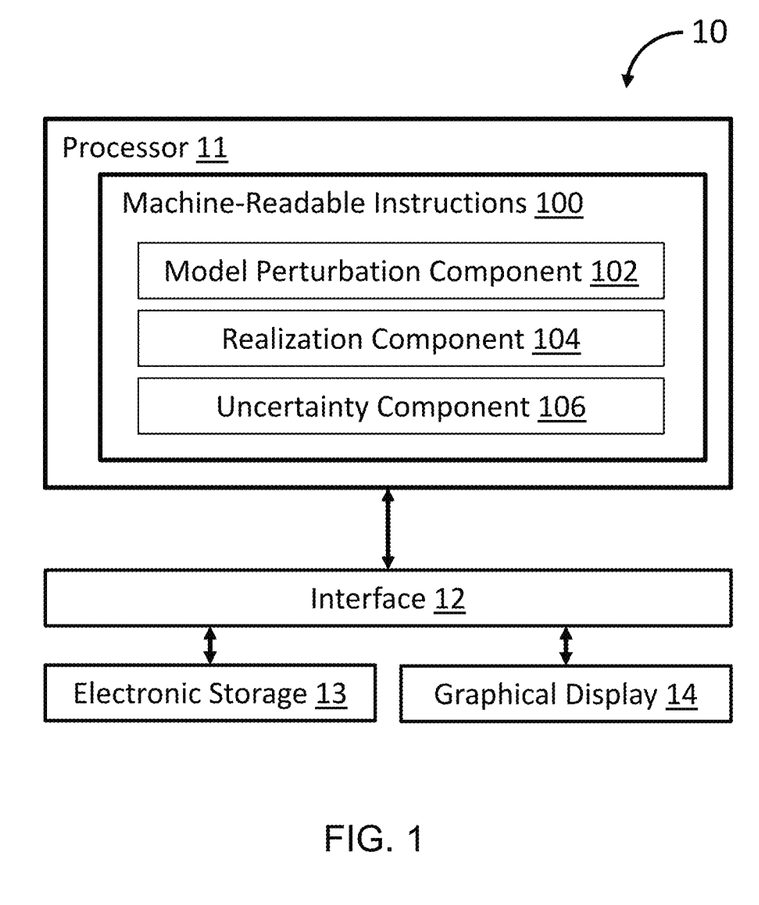
FIG. 1 illustrates an example system for estimating depth uncertainty.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a graphical display 12, and/or other components. Processor 11 is configured to execute machine-readable instructions to perform depth uncertainty analysis from seismic velocity models. The methodology performed by the present invention is significantly different from previous approaches.

The key differences include:
(1) All the unknown parameters (e.g., seismic interval velocity and anisotropic parameters) are in depth domains unlike traditional approaches, in which all unknown parameters are in time domains. This avoids errors in the conversion of time-to-depth in post-processing.
(2) Model perturbations around reference models are carried out in 2D or 3D reduced wavelet domains (depending on applications). There are several advantages of working on wavelet domains, for example, (a) providing multi-scale representations of the residuals, (b) having computational efficiencies in large-scale 3D problems (or scalable).
(3) Hierarchical Bayesian models provide a systematic approach to combine information from data through likelihood functions and other types of information (e.g., geological structures, well logs, etc.) through prior distributions. The defined joint posterior probability distribution serves as a reliable and consistent foundation for depth uncertainty analysis.
(4) Markov chain Monte Carlo (MCMC) methods are used for drawing many samples from the underlying joint distribution. Starting from one of multiple reference models, we can obtain thousands of multivariate samples.

The developed procedure provides many 2D or 3D realizations (or models), depending on applications. For example, the method could derive depths corresponding to all the realizations by integrating interval velocities at locations of interest through traveltimes. The method could obtain different statistics (e.g., minimal, and maximum values, medians, modes, confidence intervals, etc.) in order to fully describe model uncertainty and thus corresponding depth uncertainty.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to seismic images, earth models, perturbed models, realizations, and/or other information. The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

The graphical display 14 may refer to an electronic device that provides visual presentation of information. The graphical display 14 may include a color display and/or a non-color display. The graphical display 14 may be configured to visually present information. The graphical display 14 may present information using/within one or more graphical user interfaces. For example, the graphical display 14 may present information relating to seismic images, earth models, depth uncertainty, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate depth uncertainty analysis. The machine-readable instructions 100 may include one or more computer program components. The machine-readable instructions 100 may include a model perturbation component 102, a realization component 104, an uncertainty component 106, and/or other computer program components.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 100, the model perturbation component 102 may be configured to accept an initial earth model as input. The earth model is a 2-D or 3-D representation of the subsurface that includes information about the seismic velocity (P-wave velocity and/or S-wave velocity) and, optionally, the anisotropic parameters ($\eta$ and $\delta$) at each location. The model perturbation component 102 also receives wavelet basis functions and cutoff thresholds. It then randomly perturbs the wavelet coefficients in reduced wavelet space. The cutoff thresholds determine the size of reduced model space. The perturbed wavelet space model is then transformed back into the depth domain to create a candidate perturbed depth model. A plurality of candidate perturbed depth models may be created from the plurality of randomly perturbed wavelet coefficients.

The realization component 104 may be configured to receive the plurality of perturbed depth models to use in hierarchical Bayesian modeling. Hierarchical Bayesian models provide a systematic approach to combine information from data through likelihood functions and other types of information (e.g., geological structures, well logs, etc.) through prior distributions. The defined joint posterior probability distribution services as a reliable and consistent foundation for depth uncertainty analysis. Then Markov Chain Monte Carlo (MCMC) algorithms are performed to draw many samples from the underlying joint distribution. Starting from one of multiple reference models, the method can obtain thousands of multivariate samples of unknown parameters.

The uncertainty component 106 may be configured to receive the multivariate samples to use for uncertainty analysis of a wide range of quantities, which are functions of the multivariate samples. In an embodiment, this may be done by deriving depths corresponding to all the realizations by integrating interval velocities at locations of interest through traveltimes, then obtaining different statistics (e.g., minimal, and maximum values, medians, modes, confidence intervals, etc.) in order to fully describe model uncertainty and thus corresponding depth uncertainty.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

Figure 2:
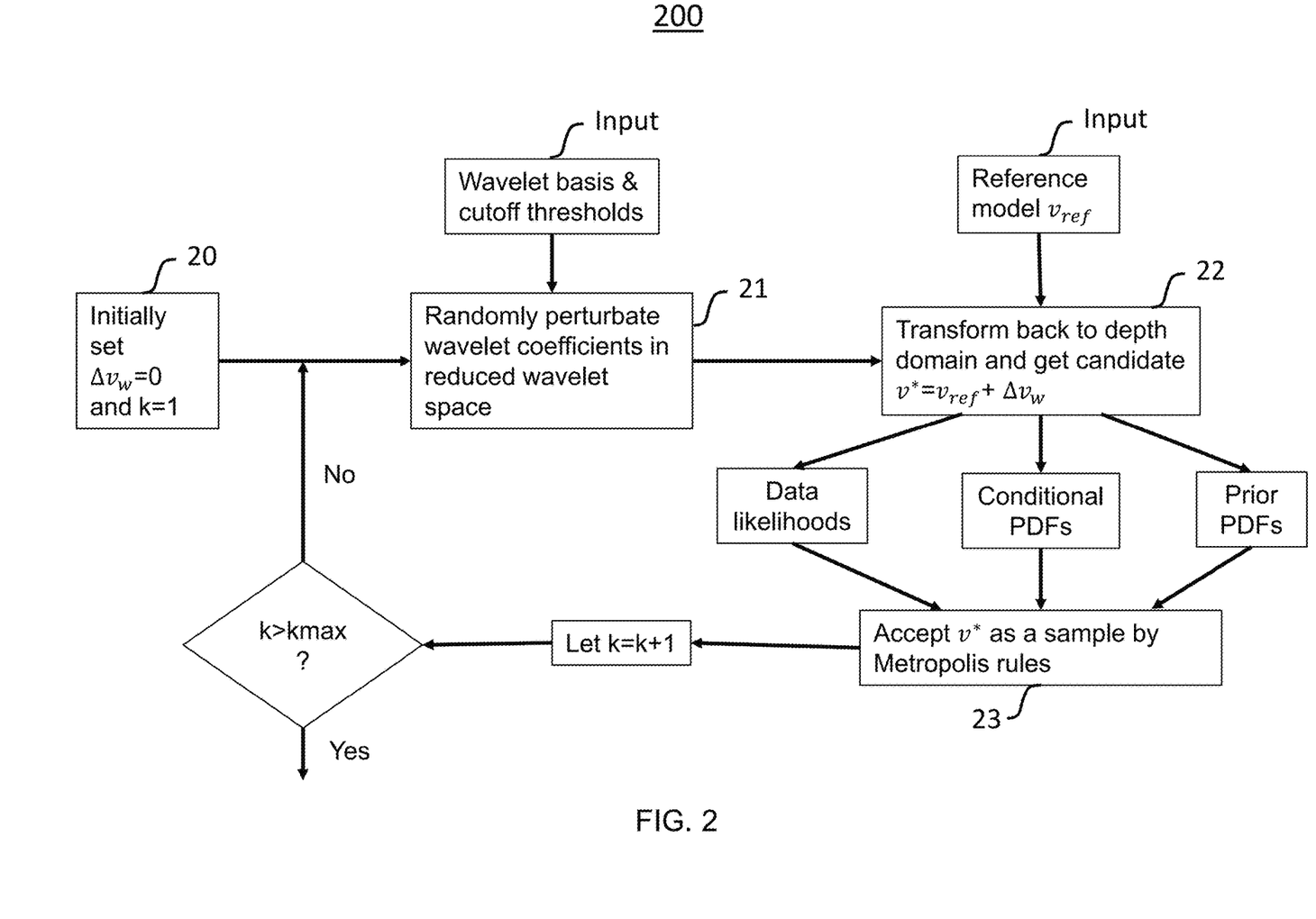
FIG. 2 illustrates an example method for estimating depth uncertainty.
Figure 3:
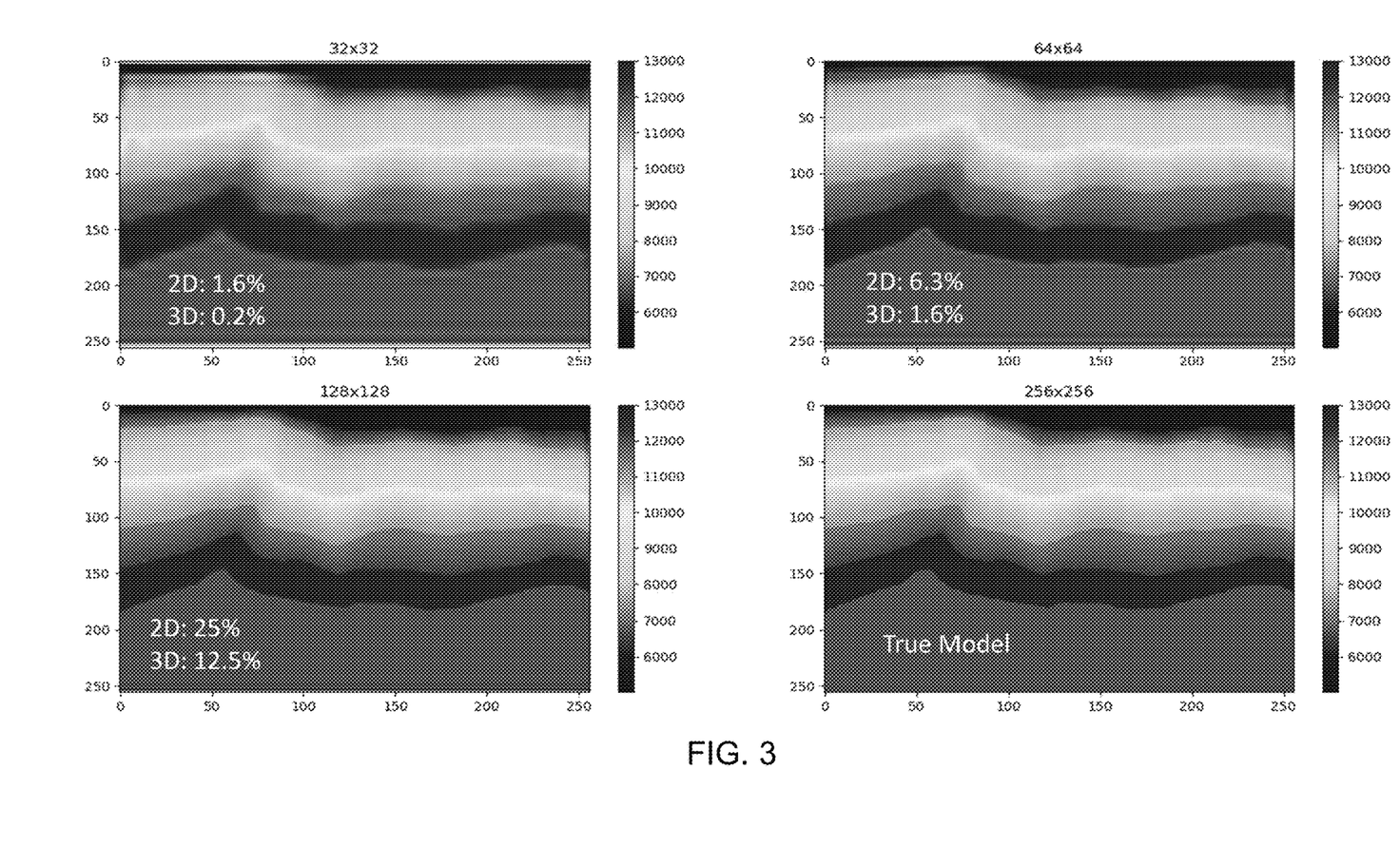
FIG. 3 illustrates the effects of reduced wavelet space.
Figure 4:
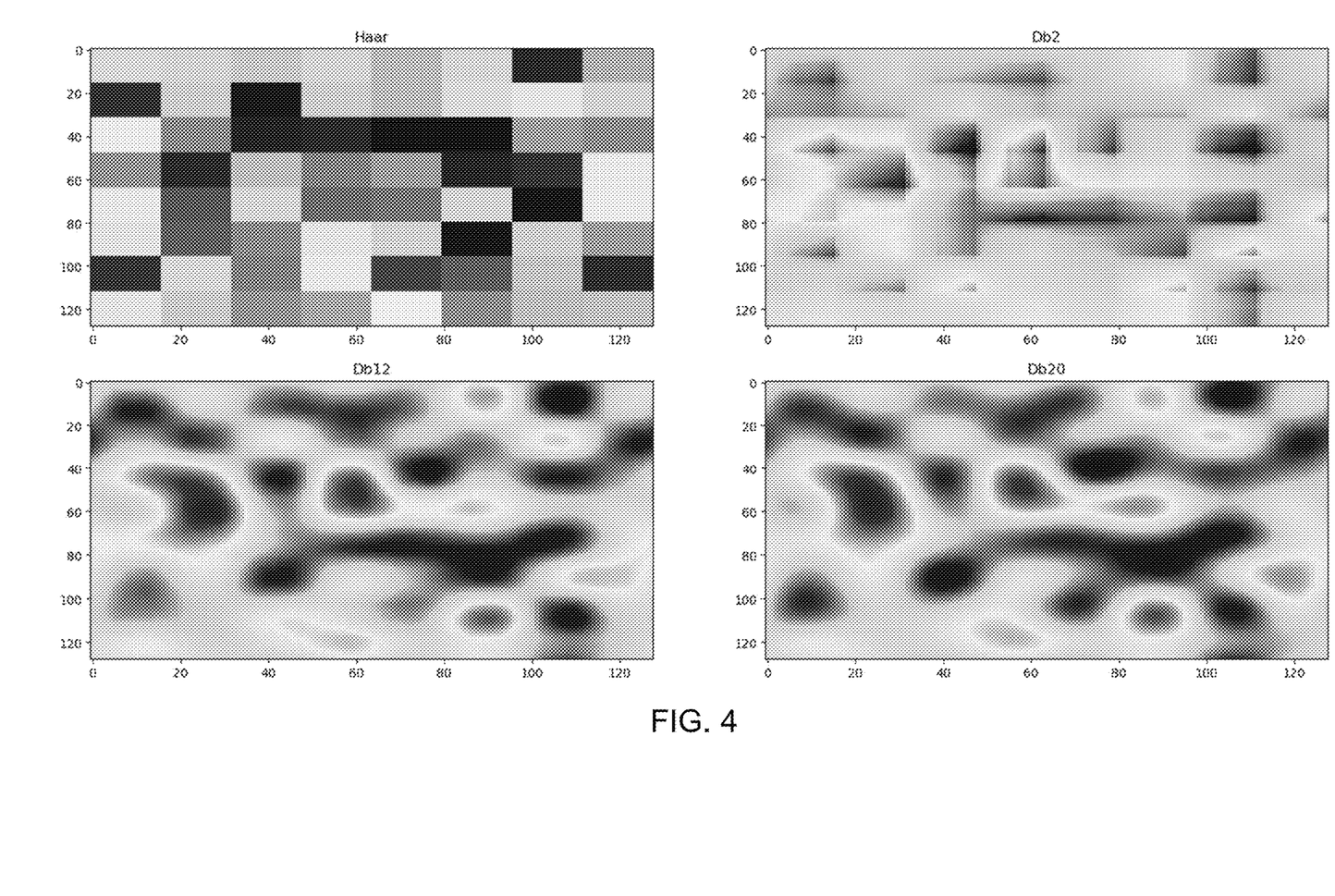
FIG. 4 illustrates a method for generating Gaussian random fields.

FIG. 2 illustrates a process 200 for depth uncertainty analysis. The method is based on random perturbations in the wavelet domain. At operation 20, the perturbation model $\Delta v_w$ is initially set to 0 for the first iteration of k (i.e., k=1). The method receives wavelet basis functions and cutoff thresholds as input to operation 21. The selected wavelet functions define the transformation between original depth domain and the wavelet domain, and it determines the features of depth domain images. The cutoff thresholds determine the size of reduced model space. The advantages of performing this in the wavelet domain is demonstrated in FIG. 3, where the true model in the lower right can be compared to the models as seen after being transformed into depth space after having been reduced in wavelet space of three different resolutions—upper left reduced to 1.6% in 2D or 0.2% in 3D, upper right reduced to 6.3% in 2D or 1.6% in 3D, and lower left reduced to 25% in 2D or 12.5% in 3D. The choice of scale to use is determined by the resolution and computational efficiency. FIG. 4 illustrates examples of possible random perturbations with four different wavelets, specifically Haar, Daubechies 2, Daubechies 12, and Daubechies 20 wavelets. As shown in FIG. 4, different wavelet transformations provide different types of perturbations of earth models in depth domain. The choice of wavelet basis functions depends on the need of applications. For example, if the underlying geological structures have many sharp changes, such as fault or fractures, we may use Haar wavelets. If the underlying structures are relatively smooth, we prefer to use Daubechies 20.

Referring again to FIG. 2, process 200 also receives a reference model $v_{ref}$ that is an initial earth model. The earth model may contain parameters representative of the velocity and, optionally, anisotropic parameters ($\eta$ and $\delta$). The random perturbations generated by operation 21 in the wavelet domain are first transformed back into the depth domain and then are combined with the reference model $v_{ref}$ to create a candidate perturbed depth model v*. A plurality of candidate perturbed depth models may be created from the plurality of randomly perturbed wavelet coefficients through the big loop covered by operations 21, 22, and 23, which will be detailed in the next item.

The candidate perturbed depth model in operation 22 is then used as input for hierarchical Bayesian modeling that utilizes data likelihoods, conditional probability distribution functions (PDFs), and prior probability distribution functions (PDFs). This may take the form of:

$$f(v,\delta,\eta,\Delta v_w,\Delta\delta_w,\Delta\eta_w|V^{obs},t^{obs})=C\times f(V^{obs}|v,\delta)\times f(t^{obs}|v,\delta,\eta)\times f(v|\Delta v_w)\times f(\delta|\Delta\delta_w)\times f(\eta|\Delta\eta_w)\times f(\Delta v_w)\times f(\Delta\delta_w)\times f(\Delta\eta_w)$$

where the lefthand function is the joint posterior distribution; the $f(V^{obs}|v, \delta)$ and $f(t^{obs}|v, \delta, \eta)$ are the likelihood functions of velocity and traveltime data; $f(v|\Delta v_w)$, $f(\delta|\Delta_w)$, $f(\eta|\Delta\eta_w)$ are conditional PDFs for linking the wavelet and depth domain parameters; and $f(\Delta v_w)$, $f(\Delta\delta_w)$, $f(\Delta\eta_w)$ are prior distributions of wavelet perturbations that correspond to interval velocity, and anisotropic parameters. These prior distributions may include, by way of example and not limitation, information on geological structures and well logs. The Bayesian model includes a hierarchical structure with perturbated wavelet coefficients in the wavelet domain being hyperparameters and velocity and anisotropic parameters in the depth domain being direct parameters linking to the data. With a proper choice of the cutoff thresholds, a significant reduction of model space can be achieved.

Referring again to FIG. 2, at operation 23 the joint posterior distribution is input to a Markov Chain Monte Carlo (MCMC) method which evaluates each sample via Metropolis rules to determine whether the candidate model vis accepted or not as a new model. Starting from one or multiple reference models, the method can obtain thousands of multivariate samples by generating many candidate models.

At this point, the iteration number k is increased by one. If the iteration number is greater than the user-defined kmax, the method ends with the plurality of multivariate models that have been produced through the loop from operation 21 to operation 23. If k is not greater than the kmax, the method is repeated, and more candidate models are appended to the plurality of candidate models.

Figure 5:
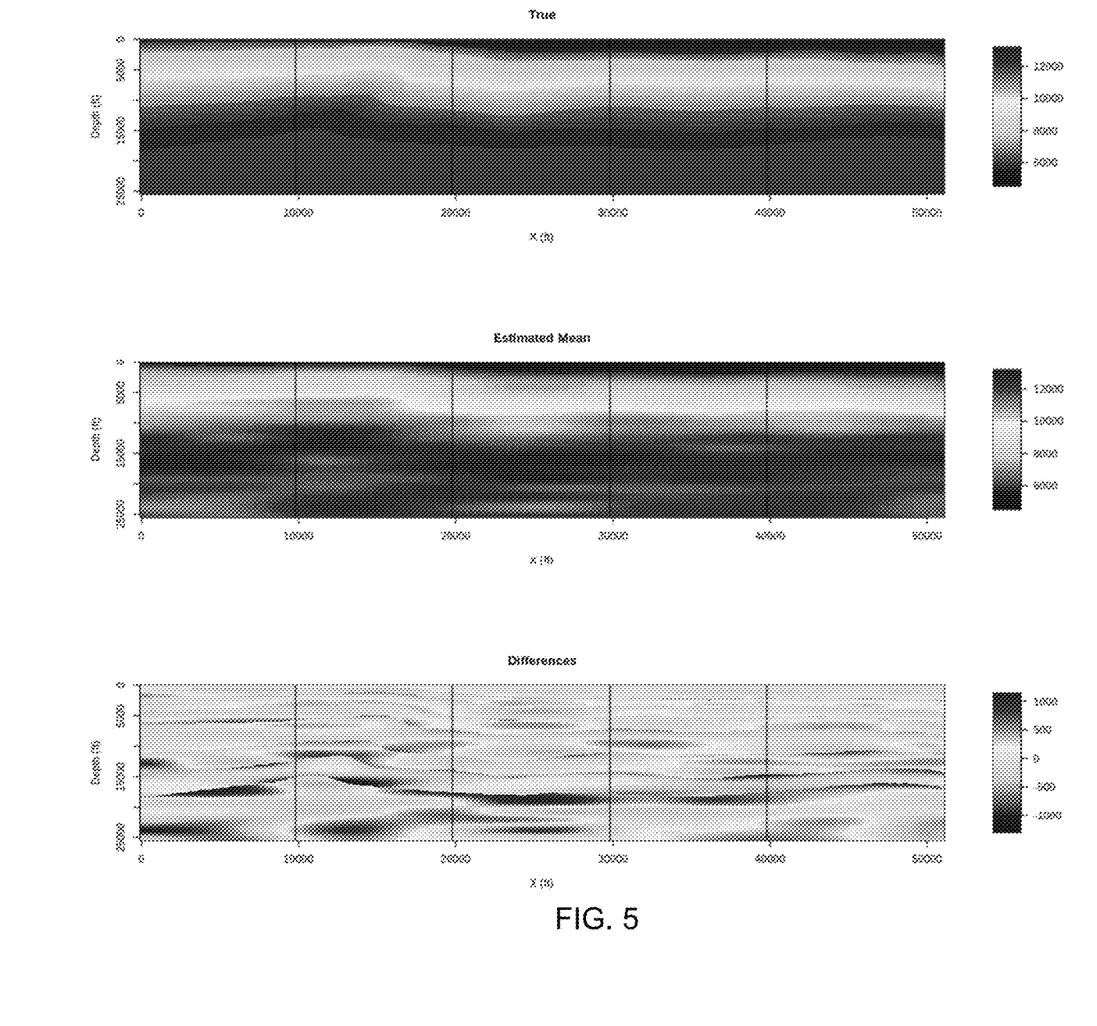
FIG. 5 illustrates a result of a method for estimating depth uncertainty.
Figure 6:
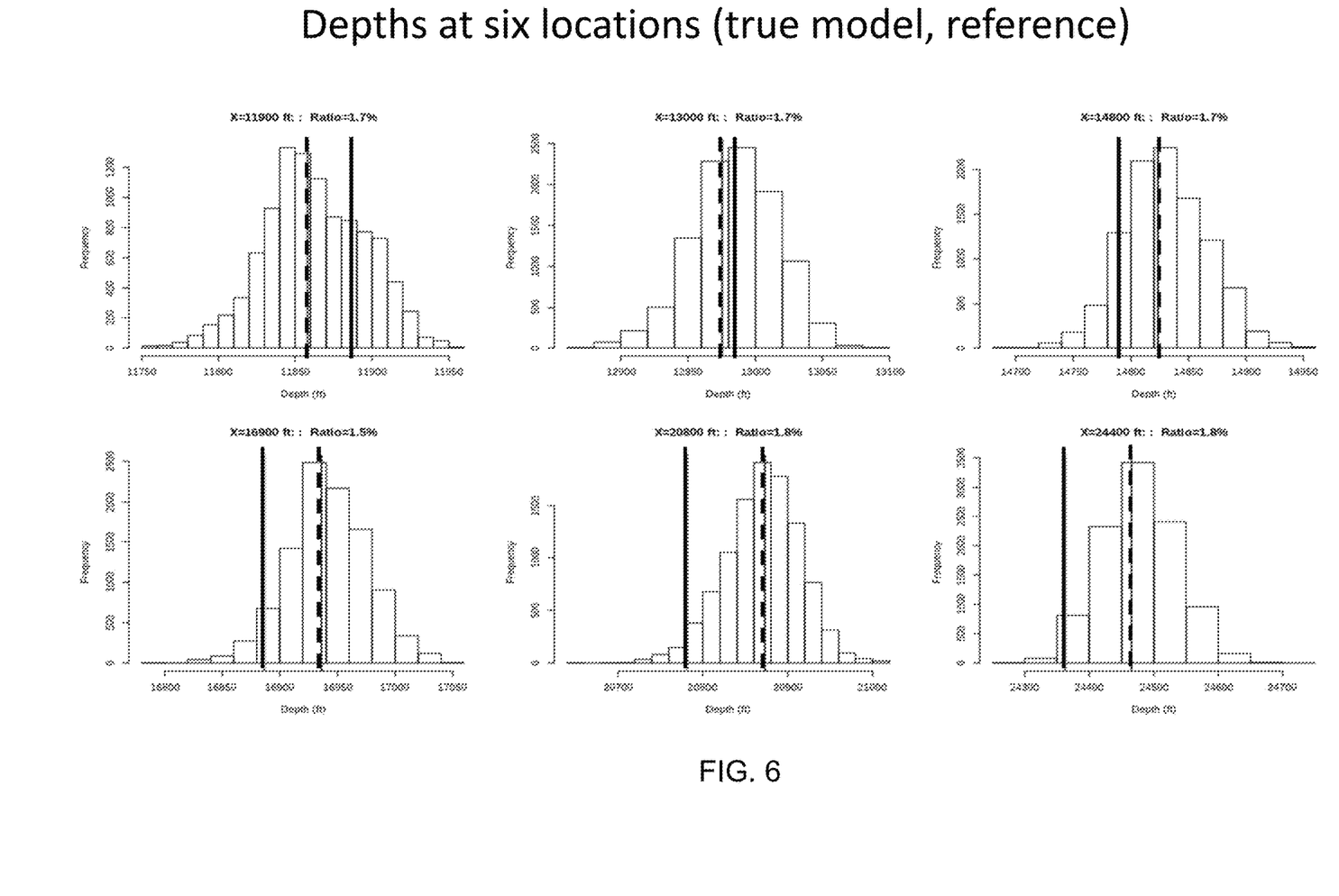
FIG. 6 illustrates another result of a method for estimating depth uncertainty.

Once method 200 has run kmax times, the plurality of multivariate models can be obtained and the MCMC process is deemed to be converged to the defined joint posterior probability distribution. The latter half of those generated models thus are used to analyze the depth uncertainty, for example, estimating mean and standard errors of each unknown parameters. For example, FIG. 5 compares a true velocity model (top) against the mean values of the model realizations generated by method 200 (middle) and the differences between the true and estimated mean are shown in the bottom panel. FIG. 6 shows histograms of candidate models at six different locations. The depth of reference model and true model at these locations are displayed with dashed lines and solid lines, respectively. The validity of candidate models is supported by the fact that the depth of true model lies within the high probability range of those corresponding histograms.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of depth uncertainty analysis, comprising:
   a. receiving, at the computer processor, wavelet basis functions and cutoff thresholds and randomly perturbing wavelet coefficients in reduced wavelet space based on the wavelet basis functions and the cutoff thresholds to generate a plurality of random wavelet fields;
   b. receiving, at a computer processor, a reference model in a depth domain;
   c. transforming the plurality of random wavelet fields to the depth domain and combining them with the reference model to form candidate models;
   d. performing a hierarchical Bayesian modeling with Markov Chain Monte Carlo (MCMC) sampling methods using the candidate models as input to generate a plurality of realizations, wherein the hierarchical Bayesian modeling uses data likelihood functions of velocity and traveltime data, conditional probability distribution functions (PDFs) linking the random wavelet fields and the depth domain, and prior PDFs that are prior distributions of wavelet perturbations that correspond to interval velocity and anisotropic parameters; and
   e. computing statistics of the plurality of realizations to estimate depth uncertainty.

2. The method of claim 1 wherein the random wavelet fields are Gaussian random fields.

3. The method of claim 1 wherein the prior PDFs are based on prior knowledge of geologic structure or well logs.

4. The method of claim 1 wherein the MCMC sampling is based on Metropolis rules.

5. A computer system, comprising:
   one or more processors;
   memory; and
   one or more programs, wherein the one or more programs are stored in the memory and configured to be executed by the one or more processors, the one or more programs including instructions that when executed by the one or more processors cause the system to:
   a. receive, at the one or more processors, wavelet basis functions and cutoff thresholds and randomly perturbing wavelet coefficients in reduced wavelet space based on the wavelet basis functions and the cutoff thresholds to generate a plurality of random wavelet fields;
   b. receive, at the one or more processors, a reference model in a depth domain;
   c. transform the plurality of random wavelet fields to the depth domain and combining them with the reference model to form candidate models;
   d. perform a hierarchical Bayesian modeling with Markov Chain Monte Carlo (MCMC) sampling methods using the candidate models as input to generate a plurality of realizations, wherein the hierarchical Bayesian modeling uses data likelihood functions of velocity and traveltime data, conditional probability distribution functions (PDFs) linking the random wavelet fields and the depth domain, and prior PDFs that are prior distributions of wavelet perturbations that correspond to interval velocity and anisotropic parameters; and
   e. compute statistics of the plurality of realizations to estimate depth uncertainty.

6. The system of claim 5 wherein the random wavelet fields are Gaussian random fields.

7. The system of claim 5 wherein the prior PDFs are based on prior knowledge of geologic structure or well logs.

8. The system of claim 5 wherein the MCMC sampling is based on Metropolis rules.

9. A non-transitory computer readable storage medium storing one or more programs, the one or more programs comprising instructions, which when executed by an electronic device with one or more processors and memory, cause the device to:
   a. receive, at the one or more processors, wavelet basis functions and cutoff thresholds and randomly perturbing wavelet coefficients in reduced wavelet space based on the wavelet basis functions and the cutoff thresholds to generate a plurality of random wavelet fields;
   b. receive, at the one or more processors, a reference model in a depth domain;
   c. transform the plurality of random wavelet fields to the depth domain and combining them with the reference model to form candidate models;
   d. perform a hierarchical Bayesian modeling with Markov Chain Monte Carlo (MCMC) sampling methods using the candidate models as input to generate a plurality of realizations, wherein the hierarchical Bayesian modeling uses data likelihood functions of velocity and traveltime data, conditional probability distribution functions (PDFs) linking the random wavelet fields and the depth domain, and prior PDFs that are prior distributions of wavelet perturbations that correspond to interval velocity and anisotropic parameters; and
   e. compute statistics of the plurality of realizations to estimate depth uncertainty.

10. The non-transitory computer readable storage medium of claim 9 wherein the random wavelet fields are Gaussian random fields.

11. The non-transitory computer readable storage medium of claim 9 wherein the prior PDFs are based on prior knowledge of geologic structure or well logs.

12. The non-transitory computer readable storage medium of claim 9 wherein the MCMC sampling is based on Metropolis rules.

* * * * *